United States Patent [19]

Ekstrom et al.

[11] 3,941,870
[45] Mar. 2, 1976

[54] PROCESS FOR THE PRODUCTION OF URANIUM HEXAFLUORIDE

[75] Inventors: Alfred Ekstrom, Miranda; Ashley Brooks McLaren, Padstow, both of Australia

[73] Assignee: Australian Atomic Energy Commission, Coogee, Australia

[22] Filed: Jan. 24, 1973

[21] Appl. No.: 326,537

[30] Foreign Application Priority Data
Feb. 2, 1972 Australia.............................. 7830/72

[52] U.S. Cl............. 423/258; 252/472; 252/477 R; 423/259; 423/261
[51] Int. Cl.² .................... C01G 43/06; C01G 43/02; B01J 23/40; B01J 35/00
[58] Field of Search.................... 423/258, 259, 261; 252/472, 477 R

[56] References Cited
UNITED STATES PATENTS

| | | | |
|---|---|---|---|
| 2,535,572 | 12/1950 | Hainer | 423/258 |
| 2,756,125 | 7/1956 | Abelson | 423/258 |
| 2,910,344 | 10/1959 | Davidson | 423/258 |
| 3,009,768 | 11/1961 | Adams et al. | 423/258 |
| 3,150,924 | 9/1964 | Smiley et al. | 423/258 |
| 3,162,606 | 12/1964 | Giraitis et al. | 252/472 X |
| 3,273,974 | 9/1966 | Gabor et al. | 423/258 |
| 3,385,670 | 5/1968 | Van Hook et al. | 252/472 X |
| 3,637,529 | 1/1972 | Van Beck | 252/472 X |
| 3,794,588 | 2/1974 | Stiles | 252/472 X |

FOREIGN PATENTS OR APPLICATIONS
281,651  1/1965  Australia.............................. 423/259

*Primary Examiner*—Benjamin R. Padgett
*Assistant Examiner*—R. E. Schafer
*Attorney, Agent, or Firm*—Haseltine, Lake & Waters

[57] ABSTRACT

The production of $UF_6$ in which $UF_4$ is reacted with air or oxygen in the presence of a catalyst at 500° to 700°C. The solid byproduct of this reaction is reduced with hydrogen in the presence of a catalyst at 400° to 600°C. Fresh $UO_3$ may also be reduced with hydrogen in the same reactor as $UO_2F_2$. The reduction product or products are reacted with hydrogen fluoride at 400° to 600°C, producing $UF_4$ which would be recycled for further reaction to produce $UF_6$.

33 Claims, 3 Drawing Figures

PROCESS FOR THE PRODUCTION OF URANIUM HEXAFLUORIDE

The invention described herein relates to the conversion of uranium tetrafluoride ($UF_4$) to uranium hexafluoride ($UF_6$) by a process which does not require the use of elemental fluorine.

The conversion of $UF_4$ to $UF_6$ is currently achieved by the reaction of $UF_4$ with elemental fluorine. However, the use of fluorine on a large scale is expensive and presents serious corrosion and toxicity hazards. For those nations, particularly, which do not possess an established fluorine generating capacity and which also possess significant uranium ore reserves, it is highly desirable to discover a practical method for the preparation of $UF_6$ which does not require the use of elemental fluorine at any stage.

The only method known to date for achieving this aim has been disclosed in the U.S. Pat. Nos. 2,535,572; 2,910,344; 3,009,768, in the British Pat. No. 897,793, and in the German Pat. No. 1,148,533. In each case, the process is based on the reaction:

$$2UF_4 + O_2 \rightarrow UO_2F_2 + UF_6 \quad (1)$$

The $UO_2F_2$ so formed can be recycled to $UF_4$ by the reactions:

$$UO_2F_2 + H_2 \rightarrow UO_2 + 2HF \quad (2)$$

and $$UO_2 + 4HF \rightarrow UF_4 + 2H_2O \quad (3)$$

The oxidation reaction (1) was studied in 1945 by Fried and Davidson, USAEC Document AECD 2981 (1945), and in 1950 by Kirslis, McMillan and Bernhardt, USAEC Document K567 (1950), who "found that no uranium hexafluoride was detected on passing oxygen over $UF_4$ until the reactor temperature reached 740°C." In early development work, Ferris, USAEC Document ORNL-2180 (1957), reported that "the rate of oxidation is not very rapid at temperatures lower then 750°C, a fact which could restrict industrial application of the reaction."

The feasibility of producing $UF_6$ from $UF_4$ by oxidation with dry air or oxygen in a fluidized bed reactor at temperatures from 700°–850°C was shown by Scott, Adams and Bresee, USAEC Document ORNL-2797 (1960). However, they observed many temperature-dependent side-reactions at these temperatures which decrease the product yield, and corrosion reactions which limit the practical application of the primary reaction in industry. When impure $UF_4$ was used as the feed material for 29 hr at a temperature of about 710°C an 18 per cent yield of $UF_6$ was obtained and the corrosion of the Inconel reactor was said to be prohibitive.

Pilot plant studies carried out in South Africa on the oxidation of $UF_4$ also showed tht the very high operating temperatures led to extreme corrosion of the fluidized bed reactor, extensive sintering of the $UF_4$, and the formation of a liquid phase consisting of a mixture of various intermediate uranium fluorides such as $UF_5$, $U_2F_9$ and $U_4F_{17}$. These pilot plant studies are disclosed in Document PEL-121, Vol. II (1965) of the Atomic Energy Board of South Africa and in the Twelfth Annual Report 1968, p. 11 of the Atomic Energy Board of South Africa. A small Inconel reaction was corroded through after 700 hours of intermittent operation at temperatures up to 810°C. A moving bed reactor was also considered to be of doubtful feasibility mainly because of the problems of handling the liquid phase arising from intermediate fluorides formed in the temperature range 700°–800°C. For these reasons, the process was not considered to be feasible, and further development was abandoned.

The present invention discloses a process for the production of $UF_6$ from $UF_4$ by the reaction of the $UF_4$ with air or oxygen in the presence of a catalyst, the use of which leads to economical rates of $UF_6$ production at temperatures of 500°–700°C and reduces the detrimental effects of $UF_4$ sintering, and the extent of corrosion.

The same catalyst may be recycled in the $UO_2F_2$ product of the oxidation reaction with advantage in that it increases the rate of reaction of the $UO_2F_2$ with hydrogen, and allows a temperature in the range of 400–600°C to be used compared with the 600°–700°C used in the present art. The catalyst may then be further recycled in the $UO_2$ product which can be converted to $UF_4$ by reaction (3).

A further advantage may be gained by feeding $UO_3$ into the process in the reduction stage as it has now been discovered that the reduction of $UO_3$ to $UO_2$ is also catalyzed by the same catalyst.

It has now been discovered that a series of platinum group metals supported on a suitable solid support are effective catalyst for reactions (1) and (2) at a temperature of 500°C or above. It has also been discovered that gold and silver supported on a suitable material, and unsupported cobalt oxide and hydrated platinum oxide, $PtO_2 \cdot xH_2O$ (Adams Catalyst), and unsupported finely divided platinum are also effective as catalysts for the oxidation reaction.

In the following, "catalyst" is taken to mean a material added to the reactants in the form of an active metal supported on a suitable substance, or an unsupported active metal or metal oxide.

The following examples of the invention are described in order to illustrate the effect of some of the various parameters of selected metals, selected supports, concentration of catalyst, and particle-size of support, on the catalysis of reactions (1) and (2).

Rates of conversion of $UF_4$ to $UO_2F_2$ and $UF_6$ were determined by studying the rate of loss of weight of a sample of $UF_4$ when heated in an atmosphere of dry oxygen gas, the sample of $UF_4$ with and without catalyst being placed in the sample holder of a conventional thermobalance. A typical platinum catalyst is prepared by mixing an aqueous solution of chloroplatinic acid with the finely-divided support material, evaporating the mixture to dryness and heating the solid so obtained in hydrogen gas at 400°C to obtain platinum metal deposited on the support. A commercially-available platinum on alumina catalyst is also equally effective. The concentration of platinum metal on alumina is usually in the range 0.1 to 5.0 per cent by weight relative to alumina, and the concentration of catalyst used was in the range 0.2 to 10.0 per cent by weight relative to $UF_4$.

The times required for 90 per cent reaction of $UF_4$ with oxygen at temperatures of 500° to 640°C and catalyst concentrations from 0.2 to 1.0 per cent for platinum on alumina are given in Table 1.

TABLE 1

RATES OF REACTION OF $UF_4$ WITH OXYGEN AT VARIOUS TEMPERATURES AND CATALYST CONCENTRATIONS*

| Temperature °C | Time Required for 90% Reaction (minutes) | | | |
|---|---|---|---|---|
| | Catalyst Concentration | | | |
| | 0% | 0.2% | 0.5% | 1.0% |
| 640 | Slow, 35% reaction in 40 minutes | 26.0 | 22.0 | 13.0 |
| 620 | slow | 32.0 | 30.0 | 15.0 |
| 590 | Very slow | 40.0 | 38.0 | 22.0 |
| 550 | Very slow | Slow | Slow | Slow, 35% in 90 minutes |
| 500 | Very slow | Very Slow | Very Slow | Slow, 5% in 100 minutes |

*$UF_4$: −60 + 120 mesh

The rates of reaction of $UF_4$ containing catalyst were substantially higher than the rate of reaction of a sample of $UF_4$ which did not contain any catalyst.

The effect of the particle size of the catalyst on the rate of reaction is illustrated by the following example. A catalyst consisting of 5 per cent by weight of platinum on −300 mesh alumina was compressed into pellets under a pressure of 4 tons per square inch. These pellets were then crushed and sieved into −35 + 85, −85 + 100, and −300 mesh fractions. Samples of these three catalysts were then mixed with −60 + 120 mesh $UF_4$ such that the final catalyst concentration in the $UF_4$ was 1 per cent by weight. The rates of reaction were then measured at 640°C on a thermobalance and are shown in Table 2.

TABLE 2

EFFECT OF CATALYST MESH SIZE ON THE RATE OF REACTION OF $UF_4$ WITH OXYGEN*

| Mesh Size of Catalyst | Time Required for 90% Reaction (mins) |
|---|---|
| −300 | 10 |
| −85 + 100 | 16 |
| −35 + 85 | 20 |

*$UF_4$: −60 + 120 mesh, 640°C.

The results show that while a decrease in reaction rate is observed with an increase in the particle size of the catalyst, the rates at 640°C in the presence of catalyst are very much higher than in the absence of catalyst (Table 1).

The effectiveness of several metals for the catalysis of the oxidation reaction (1) is illustrated in the following. A series of catalysts were prepared, each consisting of 1 to 5 per cent by weight of the stated metal supported on alumina. The rate of reaction of $UF_4$ containing concentrations of 1 or 10 per cent by weight of catalyst with oxygen at 640°C was measured on a thermobalance. The results are summarized in Table 3 and these indicate that in addition to platinum a number of other metals in the platinum group, and also gold and silver, are effective in promoting the rate of this reaction.

Cobalt oxide ($Co_3O_4$) is also an effective catalyst for the oxidation of $UF_4$; for example, the oxide in unsupported form when mixed at a concentration of 10 per cent by weight with respect to $UF_4$ promotes the rate of oxidation of $UF_4$ such that in the presence of the catalyst 50 per cent of the $UF_4$ has reacted in 15 minutes, while in the absence of catalyst 50 per cent of the $UF_4$ reacted in 50 minutes — see Table 3 hereunder.

TABLE 3

SUMMARY OF THE ACTIVITY OF VARIOUS CATALYSTS IN PROMOTING THE RATE OF THE REACTION OF $UF_4$ WITH OXYGEN AT 640°C

| Catalyst | Type | Catalyst Concentration with respect to $UF_4$ (wt.%) | Time for 50% Reaction (min) |
|---|---|---|---|
| Pt | 5% on $\gamma$-$Al_2O_3$ | 1 | 7 |
| Pt | 2.5% on $\gamma$-$Al_2O_3$ | 1 | 10 |
| Pt | 1% on $\gamma$-$Al_2O_3$ | 1 | 12 |
| Ru | 5% on $\gamma$-$Al_2O_3$ | 1 | 9 |
| Rh | 5% on $\gamma$-$Al_2O_3$ | 1 | 20 |
| Ir | 5% on $\gamma$-$Al_2O_3$ | 1 | 20 |
| Os | 5% on $\gamma$-$Al_2O_3$ | 1 | 27 |
| Pd | 5% on $\gamma$-$Al_2O_3$ | 1 | 33 |
| Au | 5% on $\gamma$-$Al_2O_3$ | 10 | 28 |
| Ag | 5% on $\gamma$-$Al_2O_3$ | 10 | 45 |
| $Co_3O_4$ | Unsupported | 10 | 15 |
| $PtO_2 \cdot x H_2O$ | Unsupported | 1 | 14 |
| Pt black | Unsupported | 1 | 9 |
| Pt metal filings | Unsupported | 1 | 28 |
| Uncatalysed reaction | | 0 | 50 |

Hydrated platinum oxide (Adams Catalyst) and unsupported platinum, either in the form commonly known as platinum black, or in the form of finely divided platinum metal filings, are also effective in promoting the rate of oxidation of $UF_4$ by oxygen (see Table 3).

Supports other than alumina are also effective in combination with the abovementioned metals in the catalytic oxidation of $UF_4$. Catalysts consisting of 5 per cent by weight of platinum were prepared on barium sulphate, magnesium oxide, silica and calcium fluoride by mixing these compounds separately with an aqueous solution containing an appropriate amount of cloroplatinic acid, evaporating the mixture to dryness and heating the solid so obtained in hydrogen gas at 400°C. It was observed that the platinum supported on these materials, catalyzed the oxidation of $UF_4$ by oxygen, although these supports did not yield catalysts as effective as those which used alumina as the support.

The same catalyst that is effective in catalyzing the oxidation of $UF_4$ with oxygen is also effective in increasing the rate of reaction of $UO_2F_2$ with hydrogen. The following examples are described in order to illustrate the effect of the concentration of a catalyst and temperature on the rate of reaction of $UO_2F_2$ with hydrogen. A catalyst consisting of 5 per cent by weight of platinum on alumina was mixed with $UO_2F_2$ at concentrations of catalyst of 0.05, 0.1 and 1.0 per cent by weight relative to $UO_2F_2$, and heated at temperatures of 550°, 610° and 660°C in a thermobalance. The resulsts (see Table 4 hereunder) show that the rate of reaction of $UO_2F_2$ with hydrogen in the presence of the catalyst is considerably higher than in the absence of the catalyst.

TABLE 4

EFFECT OF TEMPERATURE AND CATALYST CONCENTRATION ON THE RATE OF REDUCTION OF $UO_2F_2$*

| Temperature °C | Time Required for 90% Reaction (min) | | | |
|---|---|---|---|---|
| | Catalyst Concentration % by Weight | | | |
| | 0 | 0.05 | 0.1 | 1.0 |
| 550°C | 60.0 | 52.0 | 34.0 | 25.0 |
| 610°C | 31.0 | 19.0 | 15.0 | 12.0 |
| 660°C | 17.0 | 10.5 | 7.0 | 5.0 |

*$UO_2F_2$: −60 + 120 mesh

In addition to the platinum catalyst disclosed above, ruthenium, palladium, rhodium, iridium, gold, silver, copper oxide, cobalt oxide, platinium black, platinum oxide (Adams Catalyst), palladium oxide and nickel are also effective catalysts for the reduction of uranyl fluoride (see Table 5 hereunder).

TABLE 5

COMPARISON OF THE EFFECTIVENESS OF VARIOUS CATALYSTS IN PROMOTING THE RATE OF REDUCTION OF $UO_2F_2$ [B]

| Catalyst - Supported [A] 5% w/w on Alumina | Time Required for 50% Reaction $UO_3 \longrightarrow UO_2$ [C] |
|---|---|
| None | 10.0 |
| Pt | 1.5 |
| Ru | 3.0 |
| Pd | 2.0 |
| Rh | 1.8 |
| Ir | 3.4 |
| Au | 8.5 |
| Ag | 5.0 |
| Pt black | 1.0 |
| CuO | 10.0 |
| Catalyst - Unsupported [A] | |
| CuO | 10.0 |
| $Co_3O_4$ | 9.0 |
| Pt black | 1.0 |
| $PtO_2 \cdot xH_2O$ | 1.5 |
| $PdO_2$ | 2.0 |
| Ni | 2.0 |

[A] For all catalysed rates, the catalyst concentration is 1% w/w with respect to $UO_2F_2$ or $UO_3$
[B] $UO_2F_2$: −60 + 120 BSS, 600°C
[C] $UO_3$: denitrator derived, −120 + 150 BSS, 550°C The present invention discloses a catalyst which is effective in catalyzing the oxidation of $UF_4$ with oxygen, and the reaction of $UO_2F_2$ with hydrogen, and which may be recycled when the $UO_2$ product of the latter reaction is converted to $UF_4$ for re-use. The following series of experiments illustrates that the catalyst is effective in catalysing the oxidation reaction even after several cycles through reactions (1), (2) and (3). A 2-g sample of $UF_4$ containing 1 per cent by weight of a catalyst consisting of 5 per cent by weight of platinum supported on alumina, was completely converted to $UO_2F_2$ and $UF_6$ by heating in dry oxygen at 600°C for approximately 30 min. The $UO_2F_2$ so formed was then reduced to $UO_2$ by heating in an atmosphere of hydrogen gas at a temperature of approximately 500°C for approximately 30 min. The $UO_2$ was then converted to $UF_4$ by reaction with anhydrous HF at approximately 500°C. As this $UF_4$ now contained approximately 2 per cent by weight of catalyst, it was mixed with an equal weight of $UF_4$ which did not contain any catalyst. It was observed that this latter mixture of $UF_4$, now again containing 1 per cent by weight of catalyst, still reacted with oxygen gas at 600°C at a rate which is comparable to that obtained from a sample containing a catalyst which had not been subjected to the above cycle. The above cycle was then repeated four times, the rate of reaction of the $UF_4$ obtained after each recycle with oxygen gas was measured at 640°C and, as shown in Table 6, no apparent loss of catalyst activity was observed after each cycle.

TABLE 6

EFFECT OF CATALYST RECYCLING ON THE RATE OF REACTION OF $UF_4$ WITH OXYGEN*

| Sample | Time Required for 50% Reaction (min) |
|---|---|
| Original | 4.0 |
| 1st recycle | 3.5 |
| 2nd recycle | 3.5 |
| 3rd recycle | 3.6 |
| 4th recycle | 3.8 |
| $UF_4$ without catalyst | 50.0 |

*640°C, 1% w/w of catalyst, $UF_4$ −60 + 120 BSS

The present invention also envisages that the $UO_2F_2$ product containing the catalyst may also be recycled by heating it in a mixture of hydrogen-hydrogen fluoride at 400°–600°C, in place of the two separate stages described above.

The present invention discloses that the same catalyst that is effective for the oxidation of $UF_4$ with oxygen, and reduction of $UO_2F_2$ with hydrogen, is also effective for increasing the rate of reduction of $UO_3$ with hydrogen. The following example is described in order to illustrate this latter effect. A commercially-available catalyst consisting of 5 per cent by weight of platinum on alumina powder was mixed with $UO_3$ powder at a concentration of 1 per cent by weight relative to $UO_3$ and heated in hydrogen in a thermobalance at 550°C. The reaction was complete in 18 min in the presence of the catalyst compared with only 60 per cent conversion to $UO_2$ in the same time in the absence of the catalyst.

In addition to the platinum catalyst disclosed above, ruthenium, palladium, rhodium, iridium, gold, silver, copper oxide, cobalt oxide, platinum black, platinum oxide (Adams Catalyst), palladium oxide and nickel are also effective catalysts for the reduction of $UO_3$ by hydrogen (see Table 7 hereunder).

TABLE 7

COMPARISON OF THE EFFECTIVENESS OF VARIOUS CATALYSTS IN PROMOTING THE RATE OF REDUCTION OF $UO_3$ [B]

| Catalyst - Supported (A) 5% w/w on Alumina | Time Required for 50% Reaction $UO_3 \rightarrow UO_2$ |
|---|---|
| None | 10.0 |
| Pt | 1.5 |
| Ru | 3.0 |
| Pd | 2.0 |
| Rh | 1.8 |
| Ir | 3.4 |
| Au | 8.5 |
| Ag | 5.0 |
| Pt black | 1.0 |
| CuO | 10.0 |
| Catalyst - Unsupported [A] | |
| CuO | 10.0 |
| $Co_3O_4$ | 9.0 |
| Pt black | 1.0 |
| $PtO_2 \cdot xH_2O$ | 1.5 |
| $PdO_2$ | 2.0 |
| Ni | 2.0 |

[A] For all catalysed rates, the catalyst concentration is 1% w/w with respect to $UO_3$
[B] $UO_3$: denitrator derived, −120 + 150 BSS, 550°C By way of further examples of the production of $UF_6$ by the oxidation of $UF_4$ in the presence of a catalyst the following experiments in tube furnaces are described. A 6.67 g sample of $UF_4$ containing 1 per cent by weight of a catalyst containing 5 per cent by weight of platinum metal on alumina, was placed in a boat which in turn was placed in a horizontal tube furnace, the furnace being heated to a temperature of 610°C. Dry oxygen gas was passed through the furnace and over the $UF_4$ and then through two consecutive nickel cold traps which contained a series of baffle plates, the cold traps being maintained at a temperature of −80°C, at which temperature the $UF_6$ gas formed condensed to a solid of low vapor pressure. At the completion of the experiment the residue in the boat was removed, weighed, and analyzed for uranium. The $UF_6$ condensed in the cold traps was transferred by sublimation to a weighed Teflon container. It was found that the weight of $UO_2F_2$ remaining in the boat was 3.05 g representing 93.2 per cent of the theoretical yield, while the $UF_6$ collected weighed 1.81 g representing 48.3 per cent of the theoretical yield. The results of similar experiments summerized in Table 8 show that the yields of $UO_2F_2$ were in the range of 93 to 99 per cent of the theoretical, while the yields of $UF_6$ were in the range 35 to 48 per cent of theoretical.

are the solid effluent from reactor (C) and this solid is then fed to the hydrofluorination reactor (D). In this reactor $UO_2$ reacts with HF to form $UF_4$ according to equation (3). The gaseous effluent from the reactor is $H_2O$ + unreacted HF and the solid effluent is recycle $UF_4$ and catalyst. HF can be seperated from the gaseous effluents of reactors (C) and (D) and used as feed for reactor (D). It should be noted that the starting material for the production of $UF_6$ can be either $UO_2$, $UF_4$, $UO_2F_2$ or $UO_3$.

FIG. 2 differs from FIG. 1 in that it illustrates the recovery of HF in reactor (E). The gaseous effluent from reactors (C) and (D) are reacted with $UO_3$ and the solid effluent from the reactor, $UO_3 + UO_2 + UO_2F_2$ is fed to the reduction reactor (C). All unconverted $UO_3$ is reduced to $UO_2$ in the reduction reactor according to equation 5 so that the feed to the hydrofluoroination reactor (D) is the same as for FIG. 1.

$$UO_3 + H_2 \rightarrow UO_2 + H_2O \tag{5}$$

FIG. 3 is the same as FIG. 2 only that $UO_3$ is fed to the reduction reactor (C) and is directly reduced to $UO_2$ according to equation 5.

Following from the disclosure of the present invention that the oxidation of $UF_4$ the reduction of $UO_2F_2$

TABLE 8

YIELDS OF $UF_6$ AND $UO_2F_2$ FROM REACTION OF $UF_4$ WITH $O_2$ IN THE PRESENCE OF 1% OF W/W CATALYST AT 610°C

| Weight of $UF_4$ at start (g) | Weight of $UO_2F_2$ at completion of reaction (g) | % Theoretical yield of $UO_2F_2$ | Weight of $UF_6$ collected (g) | % Theoretical yield of $UF_6$ |
|---|---|---|---|---|
| 6.67 | 3.05 | 93.2 | 1.81 | 48.3 |
| 4.20 | 2.03 | 99.0 | 1.01 | 42.5 |
| 4.00 | 1.85 | 94.3 | 0.78 | 34.8 |

The low yields of $UF_6$ are due in part to the well-known difficulties associated with the quantitative condensation of small concentrations of $UF_6$ and in part to the tendency of $UF_6$ to react with the nickel surface of the furnace tube according to the equation:

$$UF_6 + Ni \rightarrow NiF_2 + UF_4 \tag{4}$$

It is believed that the yield of $UF_6$ would be much improved if the reaction were carried out under large scale conditions where the ratio of nickel surface to $UF_6$ concentration is much smaller. Such conditions would be encountered if the reaction were carried out either in a fluidized or a moving bed reaction of a large diameter.

Figure 1:
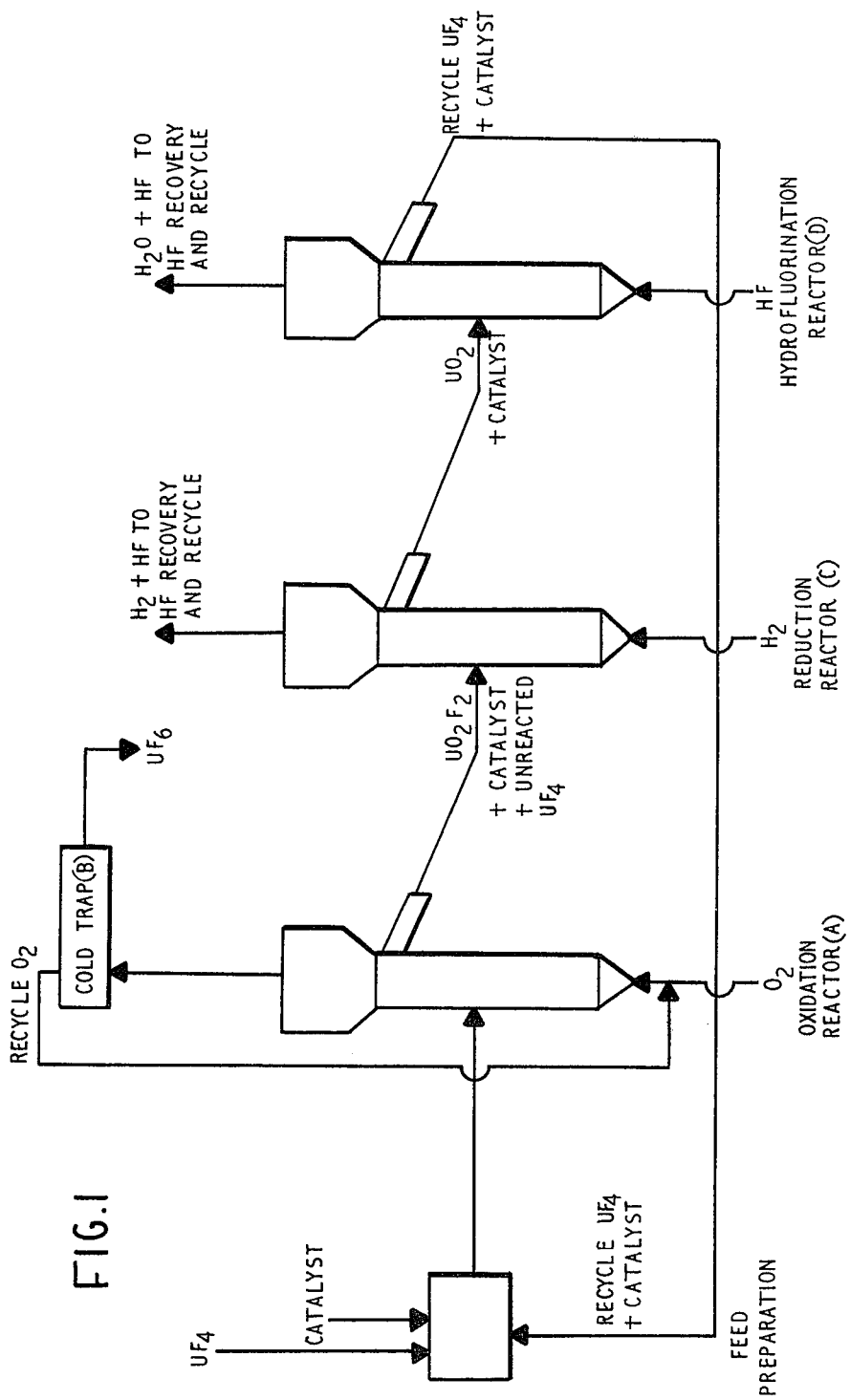
FIG. 1 is a flowsheet which illustrates the large scale production of $UF_6$ in fluidized or moving bed reactors.
Figure 2:
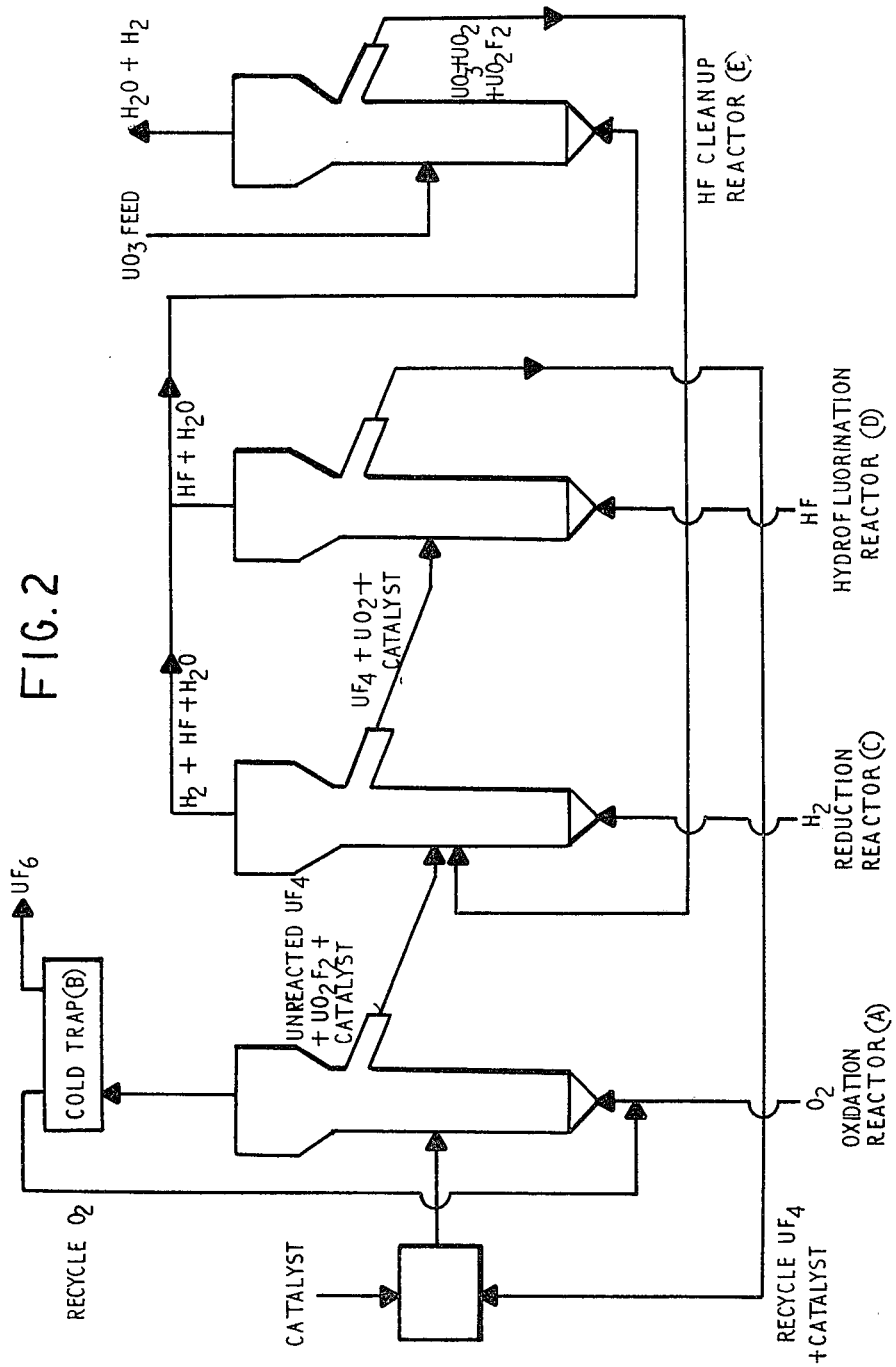
FIG. 2 is a flowsheet which additionally shows the recovery of HF.
Figure 3:
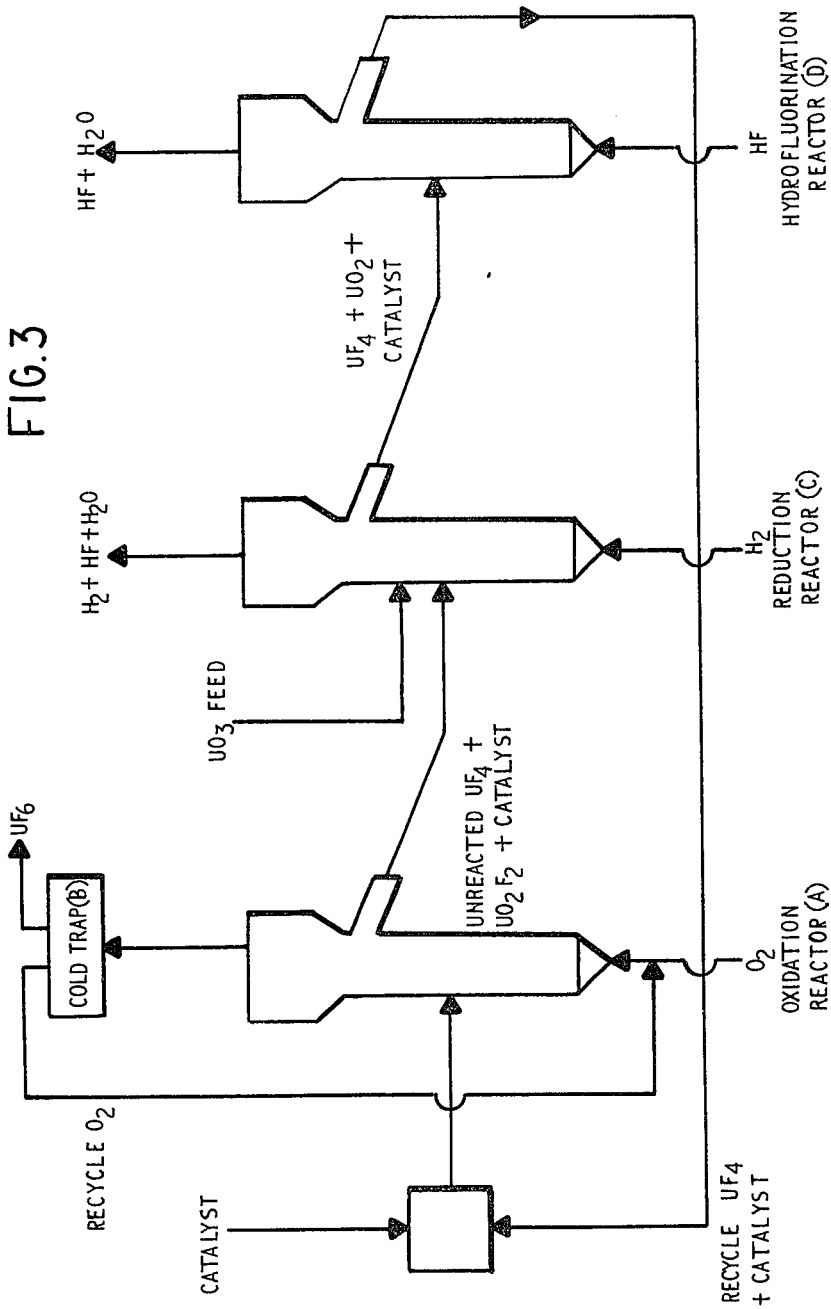
FIG. 3 is a flowsheet which illustrate the production of $UF_6$ utilizing the direct reduction of $UO_3$ to $UO_2$.

$UF_4$ and the catalyst are fed into the oxidation Reactor (A) where the $UF_4$ is converted by reaction (1) to $UO_2F_2$ and $UF_6$. The gaseous effluent from the reactor is $UF_6$ and unconverted $O_2$. The $UF_6$ is separated from $O_2$ in the cold trap (B). Unconverted $O_2$ can then be recycled back into the oxidation reactor. The solid effluent, $UO_2F_2$ and catalyst and unreacted $UF_4$, is fed into the reduction reactor (C), where $UO_2F_2$ is converted to $UO_2$ by reaction (2). The gaseous effluent from this reactor is HF and unreacted $H_2$. Both the product of the reduction reaction $UO_2$ and the catalyst and the reduction of $UO_3$, can all be catalyzed by the same catalyst, FIGS. 2 and 3 illustrate simplified integrated processes using the same catalyst for the production of $UF_6$ from $UO_3$.

The present invention discloses that a fluidized bed may be used satisfactorily for the reaction of a mixture of particles of $UF_4$ and catalyst with air or oxygen at a temperature of 500°–700°C for the production of $UF_6$ and $UO_2F_2$. By way of example, a mixture of 160 g of $UO_2F_2$ and 40 g of $UF_4$ powder of −60 + 120 mesh containing 2 per cent by weight of a catalyst consisting of 5 per cent by weight of platinum on alumina of −60 + 120 mesh, was fluidized with a flow of 1.6 L/min of oxygen gas in a 42 mm diameter fluidized bed reactor at 650°C for 30 minutes, during which time the oxidation reaction was substantially (90 per cent) complete. This rate of reaction is approximately the same as a conversion of 95 per cent obtained in experiments under similar conditions but without fluidization in a thermobalance. By comparison, in the absence of catalyst, only 35 per cent conversion was obtained in 60 minutes under the same reaction conditions.

The above examples are merely illustrative and are not to be understood as limiting the scope of our invention. It will be apparent to those skilled in the art that many variations in apparatus and procedure may be employed without departing from the scope of our intention.

What we claim is:

1. A method for the production of $UF_6$ comprising reacting $UF_4$ with air or oxygen at a temperature of 500° to 700°C in the presence of a catalyst selected from the group consisting of platinum, ruthenium, palladium, rhodium, osmium, iridium, gold, silver, nickel, copper oxide, cobalt oxide, platinum oxide and palladium oxide either unsupported or on a support selected from the group consisting of alumina, magnesia, silica, calcium fluoride and barium sulphate.

2. A method for the production of $UF_6$ comprising reacting $UF_4$ with air or oxygen at a temperature of 500° to 700°C in the presence of a catalyst selected from the group consisting of platinum, ruthenium, palladium, rhodium, osmium, iridium, gold, silver, nickel, copper oxide, cobalt oxide, platinum oxide and palladium oxide either unsupported or on a support selected from the group consisting of alumina, magnesia, silica, calcium fluoride and barium sulphate, reducing a by-product of the reaction ($UO_2F_2$) in the presence of the same catalyst with hydrogen at 400° to 600°C and reacting the reduction product ($UO_2$) with hydrogen fluoride in the presence of the same catalyst at 400° to 600°C to produce $UF_4$ which is recycled for further reaction to produce $UF_6$.

3. A method for the production of $UO_2$ comprising reacting $UO_2F_2$ with hydrogen at a temperature of 400° to 600°C in the presence of a catalyst selected from the group consisting of platinum, ruthenium, palladium, rhodium, iridium, gold, silver, nickel, copper oxide, cobalt oxide, platinum oxide and palladium oxide either unsupported or on a support selected from the group consisting of alumina, magnesia, silica, calcium fluoride and barium sulphate.

4. A method for the production of $UF_4$ comprising reacting $UO_2$ with hydrogen fluoride at a temperature of 400° to 600°C in the presence of a catalyst selected from the group consisting of platinum, ruthenium, palladium, rhodium, iridium, gold, silver, nickel, copper oxide, cobalt oxide, platinum oxide and palladium oxide either unsupported or on a support selected from the group consisting of alumina, magnesia, silica, calcium fluoride and barium sulphate.

5. A method for the production of $UO_2$ comprising reacting $UO_3$ with hydrogen at a temperature of 400° to 600°C in the presence of a catalyst selected from the group consisting of platinum, ruthenium, palladium, rhodium, iridium, gold, silver, nickel, copper oxide, cobalt oxide, platinum oxide and palladium oxide either unsupported or on a support selected from the group consisting of alumina, magnesia, silica, calcium fluoride and barium sulphate.

6. A method for the production of $UF_6$ comprising reacting $UF_4$ with air or oxygen at a temperature of 500° to 700°C in the presence of a catalyst selected from the group consisting of platinum, ruthenium, palladium, rhodium, osmium, iridium, gold, silver, nickel, copper oxide, cobalt oxide, platinum oxide and palladium oxide either unsupported or on a support selected from the group consisting of alumina, magnesia, silica, calcium fluoride and barium sulphate, reducing a by-product of the reaction ($UO_2F_2$) and fresh $UO_3$ with hydrogen in the presence of the same catalyst at 400° to 600°C, and hydrofluorinating the resulting mixture of solids in the presence of the same catalyst at 400° to 600°C to produce $UF_4$ which is recycled for further reaction to produce $UF_6$.

7. A method as claimed in claim 1 in which the $UF_4$ contains 0.1 to 5 percent by weight of said catalyst consisting of 0.1 to 5 percent by weight of platinum supported on alumina.

8. A method as claimed in claim 2 in which the $UF_4$ contains 0.1 to 5 percent by weight of said catalyst consisting of 0.1 to 5 percent by weight of platinum supported on alumina.

9. A method as claimed in claim 3 in which the $UF_4$ contains 0.1 to 5 percent by weight of said catalyst consisting of 0.1 to 5 percent by weight of platinum supported on alumina.

10. A method as claimed in claim 4 in which the $UF_4$ contains 0.1 to 5 percent by weight of said catalyst consisting of 0.1 to 5 percent by weight of platinum supported on alumina.

11. A method as claimed in claim 5 in which the $UF_4$ contains 0.1 to 5 percent by weight of said catalyst consisting of 0.1 to 5 percent by weight of platinum supported on alumina.

12. A method as claimed in claim 6 in which the $UF_4$ contains 0.1 to 5 percent by weight of said catalyst consisting of 0.1 to 5 percent by weight of platinum supported on alumina.

13. A method as claimed in claim 1 in which the $UF_4$ contains 1 to 10 percent by weight of said catalyst which is a metal selected from the group consisting of ruthenium, osmium, palladium, iridium, rhodium, gold and silver at a concentration of 0.5 to 10 percent by weight on alumina.

14. A method as claimed in claim 2 in which the $UF_4$ contains 1 to 10 percent by weight of said catalyst, which is a metal selected from the group consisting of ruthenium, osmium, palladium, iridium, rhodium, gold and silver at a concentration of 0.5 to 10 percent by weight on alumina.

15. A method as claimed in claim 6 in which the $UF_4$ contains 1 to 10 percent by weight of said catalyst, which is is a metal selected from the group consisting of ruthenium, osmium, palladium, iridium, rhodium, gold and silver at a concentration of 0.5 to 10 percent by weight on alumina.

16. A method as claimed in claim 1 in which the $UF_4$ contains 5 to 20 percent by weight of cobalt oxide ($Co_3O_4$) as the catalyst.

17. A method as claimed in claim 2 in which the $UF_4$ contains 5 to 20 percent by weight of cobalt oxide ($Co_3O_4$) as the catalyst.

18. A method as claimed in claim 6 in which the $UF_4$ contains 5 to 20 percent by weight of cobalt oxide ($Co_3O_4$) as the catalyst.

19. A method as claimed in claim 1 in which the $UF_4$ contains 0.1 to 5 percent by weight of a catalyst added as hydrated platinum oxide.

20. A method as claimed in claim 2 in which the $UF_4$ contains 0.1 to 5 percent by weight of a catalyst added as hydrated platinum oxide.

21. A method as claimed in claim 6 in which the $UF_4$ contains 0.1 to 5 percent by weight of a catalyst added as hydrated platinum oxide.

22. A method as claimed in claim 1 in which the $UF_4$ contains 0.1 to 5 percent by weight of platinum black or platinum metal filings.

23. A method as claimed in claim 2 in which the $UF_4$ contains 0.1 to 5 percent by weight of platinum black or platinum metal filings.

24. A method as claimed in claim 6 in which the $UF_4$ contains 0.1 to 5 percent by weight of platinum black or platinum metal filings.

25. A method as claimed in claim 1 wherein the reacting of the $UF_4$ with the air or oxygen comprises adding the $UF_4$ and said catalyst to a fluidized bed of 26. A method as claimed in claim 2 wherein the reacting of the UF$_4$ with the air or oxygen comprises adding the UF$_4$ and said catalyst to a fluidized bed of UO$_2$F$_2$ particles which may also contain catalyst, removing the UF$_6$ in the gaseous phase and condensing the UF$_6$.

27. A method as claimed in claim 6 wherein the reacting of the UF$_4$ with the air or oxygen comprises adding the UF$_4$ and said catalyst to a fluidized bed of UO$_2$F$_2$ particles which may also contain catalyst, removing the UF$_6$ in the gaseous phase and condensing the UF$_6$.

28. A method as claimed in claim 13 wherein the reacting of the UF$_4$ with the air or oxygen comprises adding the UF$_4$ and said catalyst to a fluidized bed of UO$_2$F$_2$ particles which may also contain catalyst, removing the UF$_6$ in the gaseous phase and condensing the UF$_6$.

29. A method as claimed in claim 14 wherein the reacting of the UF$_4$ with the air or oxygen comprises adding the UF$_4$ and said catalyst to a fluidized bed of UO$_2$F$_2$ particles which may also contain catalyst, removing the UF$_6$ in the gaseous phase and condensing the UF$_6$.

30. A method as claimed in claim 15 wherein the reacting of the UF$_4$ with the air or oxygen comprises adding the UF$_4$ and said catalyst to a fluidized bed of UO$_2$F$_2$ particles which may also contain catalyst, removing the UF$_6$ in the gaseous phase and condensing the UF$_6$.

31. A method as claimed in claim 1 in which the UF$_4$ contains 0.1 to 5 percent by weight of said catalyst, which consists of 0.1 to 5 percent by weight of platinum supported on alumina, said reacting of the UF$_4$ with the air or oxygen comprising adding the UF$_4$ and catalyst to a fluidized bed of UO$_2$F$_2$ particles which may also contain catalyst, removing the UF$_6$ in gaseous state and condensing the UF$_6$.

32. A method as claimed in claim 2 in which the UF$_4$ contains 0.1 to 5 percent by weight of said catalyst, which consists of 0.1 to 5 percent by weight of platinum supported on alumina, said reacting of the UF$_4$ with the air or oxygen comprising adding the UF$_4$ and catalyst to a fluidized bed of UO$_2$F$_2$ particles which may also contain catalyst, removing the UF$_6$ in gaseous state and condensing the UF$_6$.

33. A method as claimed in claim 6 in which the UF$_4$ contains 0.1 to 5 percent by weight of said catalyst, which consists of 0.1 to 5 percent by weight of platinum supported on alumina, said reacting of the UF$_4$ with the air or oxygen comprising adding the UF$_4$ and catalyst to a fluidized bed of UO$_2$F$_2$ particles which may also contain catalyst, removing the UF$_6$ in gaseous state and condensing the UF$_6$.

* * * * *